United States Patent [19]

Müller

[11] Patent Number: 4,730,136
[45] Date of Patent: * Mar. 8, 1988

[54] TWO-PULSE PERMANENT MAGNET BRUSHLESS D-C MOTOR

[75] Inventor: Rolf Müller, Black Forest, Fed. Rep. of Germany

[73] Assignee: Papst-Motoren GmbH & Co. Kg, St. Georgen, Fed. Rep. of Germany

[*] Notice: The portion of the term of this patent subsequent to Aug. 9, 2000 has been disclaimed.

[21] Appl. No.: 778,772

[22] Filed: Sep. 23, 1985

Related U.S. Application Data

[63] Continuation of Ser. No. 605,997, May 3, 1984, abandoned, which is a continuation of Ser. No. 335,484, Dec. 29, 1981, abandoned.

[30] Foreign Application Priority Data

Dec. 30, 1980 [DE] Fed. Rep. of Germany ......... 304949

[51] Int. Cl.⁴ ............................................. H02K 11/00
[52] U.S. Cl. .................... 310/68 R; 310/67 R; 310/156; 310/216; 310/259; 318/318; 318/254
[58] Field of Search .................. 310/68 R, 216, 68 B, 310/254, 67 R, 46, 258, 156, 263, 191-193, 172, 259, 177, 269; 318/254 A, 138, 254

[56] References Cited

U.S. PATENT DOCUMENTS

| 3,873,897 | 3/1975 | Muller | 310/192 |
| 4,011,475 | 3/1977 | Schmider | 310/68 R |
| 4,099,104 | 7/1978 | Muller | 318/254 A |
| 4,217,508 | 8/1980 | Uzuka | 310/67 R |
| 4,286,184 | 8/1981 | Kogler | 310/67 R |
| 4,357,563 | 11/1982 | Ohno | 310/67 R |
| 4,365,187 | 12/1982 | McDaniel | 318/138 |
| 4,398,134 | 8/1983 | Muller | 318/138 |
| 4,429,263 | 1/1984 | Muller | 310/68 R |

FOREIGN PATENT DOCUMENTS 2346380 11/1974 Fed. Rep. of Germany .... 310/68 R

OTHER PUBLICATIONS

"Zweipulsige Kollectorlose Gleichstrommotoren", R. Müller, ASR-Digest für Angewandte Antriebtechnik, Heft 1-2/1977.

Primary Examiner—R. Skudy
Attorney, Agent, or Firm—Fitch, Even, Tabin & Flannery

[57] ABSTRACT

The invention provides a two-pulse brushless direct current motor with reluctance auxiliary torque. The rotor has an approximately trapezoidal magnetization with small gaps between the poles. These gaps are positioned so that they come to rest opposite the point of largest air gap when the motor is deenergized. The motor has a high starting torque from this position of the rotor.

14 Claims, 6 Drawing Figures

TWO-PULSE PERMANENT MAGNET BRUSHLESS D-C MOTOR

This application is a continuation of application Ser. No. 605,997 filed May 3, 1984, now abandoned, which is a continuation application of Ser. No. 335,484, filed on Dec. 29, 1981, now abandoned.

This invention relates to a brushless permanent magnet d-c motor, and more particularly to such a motor having a cylindrical air gap in which the stator structure includes armature pole shoes which have a circumference that deviates somewhat from true cylindrical form so that the air gap is non-uniform. A motor with a non-uniform air gap is described in co-pending application U.S. Ser. No. 147,144, filed May 6, 1980, now U.S. Pat. No. 4,398,134 assigned to the assignee of this application. Motors with non-uniform air gaps and which are pulse-energized are now known in the art and have been described in both patent as well as technical literature, see, for example, German Patent No. 23 46 380, assigned to the assignee of this application; and an article by the inventor hereof entitled "Two-Pulse Brushless d-c Motors - Construction and Operation", published in "asr-digest fur angewandte Antriebstechnik", issue 1-2/1977 (asr-digest for applied motive power technology), pages 27–31.

Two-pulse brushless d-c motors may be defined as motors which have a stator winding which receives two current pulses for each rotation of the permanent magnet rotor over 360 electrical degrees (°-el). Typically, the pulses do not last for 180°-el but are shorter. Current flow through the windings or coils of the stator, typically, is controlled by solid-state switching elements, such as transistors, which are controlled to conduction or cut-off, respectively, by a galvano magnetic sensor, for example, a Hall generator.

Motors, for example as described in the aforementioned German Patent No. 23 46 380, are suitable for many applications. Some applications require an extreme of uniformity of torque throughout the entire range of rotation of the rotor. The stator structure, using salient poles, will have gaps between the poles. These gaps are needed in order to permit winding of the armature windings on the stator poles. The presence of these stator pole gaps can become troublesome in selected applications where an extreme of uniformity of torque is required. If the motor or its connected elements have sufficient inertia, then the torque variations due to the stator pole gaps may not be material. The momentary or instantaneous variations in speed as the torque changes when a magnetically active portion of the permanent magnet rotor passes over the pole gaps are difficult to measure with the type of measuring equipment usually used to test motors. In applications in which the resolution of instantaneous speed is critical, however, for example in video recording equipment, momentary variations in operating speed may produce distortions in the resulting picture. These distortions, apparently, are caused by the rotor pole gaps passing over the stator pole gaps and receiving, first, a driving reluctance torque due to the increase in air gap, and than a braking or retarding reluctance torque, due to the decrease in effective magnetic air gap.

A motor as described in the aforementioned co-pending U.S. application, now U.S. Pat. No. 4,398,134 however, will deliver only a relatively weak starting torque, although it has an extremely uniform torque-revolution characteristic. Thus, in instances where the motor only has to overcome limited friction in starting, this earlier described motor is excellent. Such a motor is less suitable, however, for applications requiring a strong starting torque, as in an application wherein the apparatus must be started against so-called dry friction. Such may occur, for example, in sealed bearings characteristically used in disk storage drives.

It is an object of this invention, therefore, to provide a motor of the foregoing type which starts reliably against dry friction.

Briefly, by displacing the rotation position detector in a direction counter to the rotation direction, a rapid rise in the motor current is obtained in the range of the low induced voltage and consequently a high electromagnetic torque, which subsequently drops when the induced voltage reaches a high level.

Because of the shape of the lamination, the maximum braking reluctance torque also occurs in the range of this initial high electromagnetic torque and it subsequently drops to roughly the same extent as the driving electromagnetic torque, so that the two torques approximately supplement one another to give a constant value. On switching off the motor, this maximum braking reluctance torque draws the rotor reliably into a position of rest which is favourable for starting, so that reliable starting is ensured.

Further details and advantageous further developments of the invention can be gathered from the illustrated embodiment with reference to the attached drawings, wherein.

Figure 1:
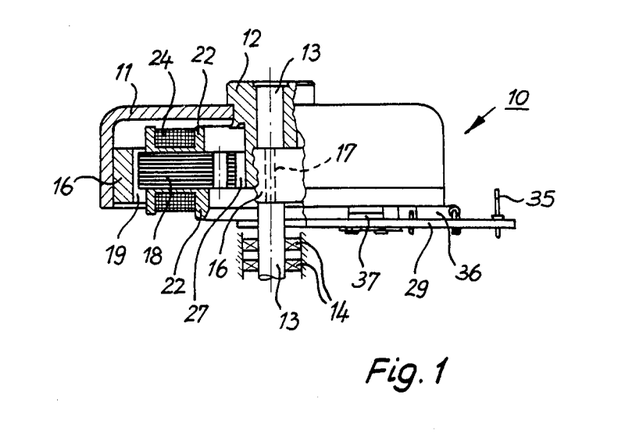
FIG. 1 is a side view, partly in section along ling I—I of FIG. 2 of an embodiment of a motor constructed according to the invention, in this case an external rotor-type motor.

FIG. 1 illustrates an external rotor motor 10 drawn, for one model, approximately to a scale of 1:1. It has a rotor bell 11 made of deep-drawn steel having a center bushing 12 fitted thereon and coupled to a shaft 13. The shaft 13 is journaled in suitable bearings 14 externally of the motor, and secured in a suitable frame or support, not shown. An annular magnet 16 is adhesively secured to the inside 15 of the rotor bell 11. Typically, the magnet 16 is a rubber magnet, that is, a mixture of heard ferrite material and elastomeric material. The magnet 16 is radially magnetized and has four poles, see FIGURE 5, in which two poles are shown. The pole gaps 17 of the rotor magnet 16 can be slightly inclined. As illustrated in FIG. 1, however, the pole gap 17 is non-sloping.

The rotor poles have in each case an approximately trapezoidal magnetization and the pole gaps 17 are narrow. In each case, they have a width of approximately 10 to 20°-el, i.e. in the case of the rotor poles the approximately constant induction range is large, as is described in detail in German Patent No. 23 46 380.

A stator lamination stack 18 is coated with a plastic, except at the air gap 19, which plastic simultaneously is shaped to provide coil forms 22 (FIG. 1). Four stator windings or coils are wound on form 22. Only windings 23, 24, 25 are visible in FIGS. 1 and 2, however. The windings can be arranged in various ways and, for purposes of a motor with extremely uniform torque and two-pulse operation, for example as known and as described in the literature, and specifically as described in German Patent No. 23 46 380, FIG. 1 or as described in connection with FIGS. 2 and 3 of the aforementioned literature reference "Two-Pulse Brushless d-c Motors" by Müller. Two current pulses are supplied to the winding for each rotor rotation of 360°-el. Typically, the duration of a pulse is less than 180°-el so that gaps in the electromagnetic drive torque will result. These gaps in torque are supplemented by a reluctance torque. See, for example, the referenced FIG. 5 of the aforementioned German Patent No. 23 46 380. Since the basic structure, as well as the operation and the operating theory, is known and described in the literature, and thus forms part of the state of the art, a further detailed explanation is not necessary. A brief review will be given below where the difference between the present invention and prior art structures is explained.

Figure 2:
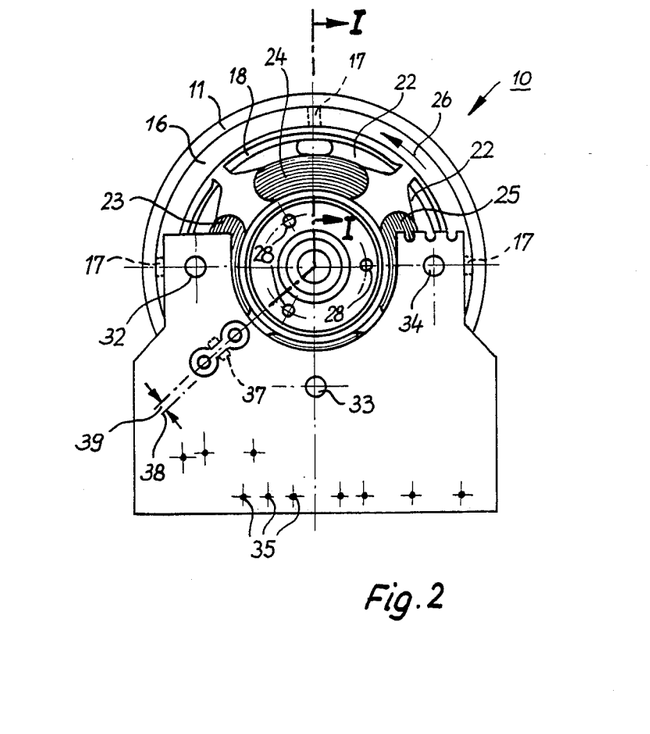
FIG. 2 is a bottom view of the motor of FIG. 1.
Figure 4:
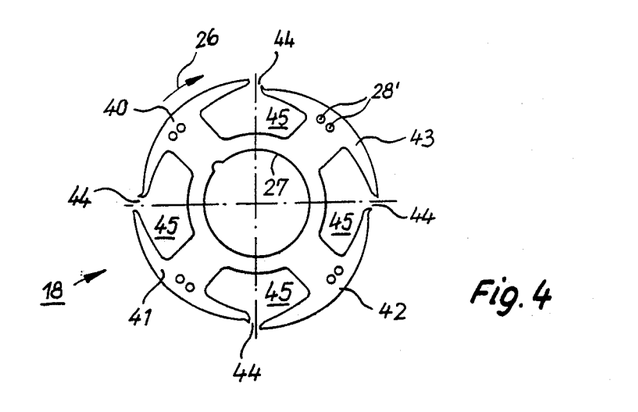
FIG. 4 is a plan view of a complete lamination as in FIG. 3, but in the natural size and represented in mirror inverted manner compared with FIG. 3.
Figure 5:
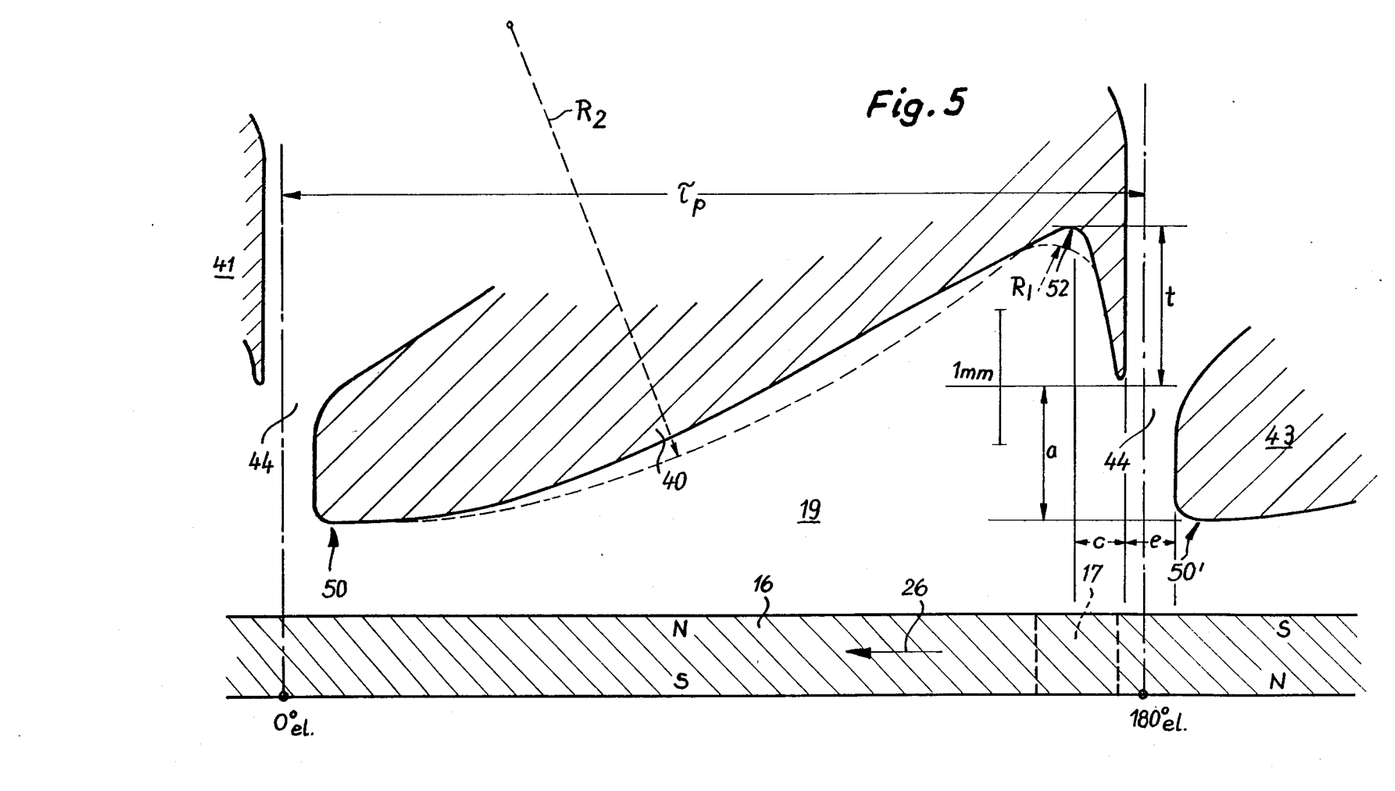
FIG. 5 is an enlarged, developed view of the air gap configuration of the motor of FIGS. 1 to 4 over a portion of the circumference thereof.

The direction of rotation of the rotor of the motor 10 is indicated in FIGS. 2, 4 and 5 by arrow 26.

The stator lamination stack 18 is internally provided with an opening 27 through which projects the bushing 12, as well as with mounting holes 28 for mounting on a device to be driven and which in practice may also contain the rotor bearings 14. In addition, mounting holes 28' are provided in the stator lamination stack 18.

With reference to FIG. 1, there is provided on the bottom of motor 10 a printed circuit board 29 which at three points 32, 33 and 34 is fixed to projections of coil formers 22 of the stator and which carries in the represented manner terminal pins 35 as indicated, components 36 and a position detector or Hall generator 37. The position detector 37 is thus fixedly mounted with respect to the stator. In a conventional manner, the Hall generator is connected to solid-state switching elements (not shown) such as transistors, so as to control their conduction or cut-off, and the solid state switching elements are connected to the windings 23, 24, 25, etc., so as to control the current flow through the windings. The Hall generator 37 is not located in the neutral zone designated 38 in FIG. 2 and which passes through the center of the particular slot opening, but is instead displaced by an angle 39 from the center of a slot opening in a direction counter to the rotation direction. The angle 39 is preferably 0° to 5°-el. As in co-pending U.S. application Ser. No. 147,144, filed May 6, 1980, now U.S. Pat. No. 4,398,134, the Hall generator 37 is used for controlling the currents in windings 23, 24, 25, etc., and is controlled by the magnetic field (i.e., magnetization) of the rotor magnet 16 to obtain an accordingly earlier commutation as will be explained more fully below. The individual connections of the windings are soldered to corresponding points of the printed circuit board 29.

Figure 3:
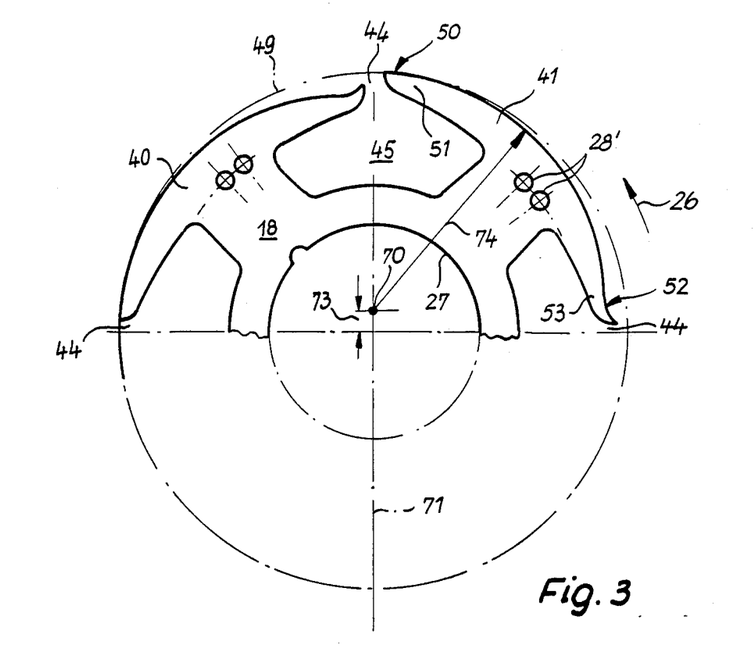
FIG. 3 is a plan view of a stator lamination used with the motor of FIGS. 1 and 2, approximately in an enlargement scale of 2:1.

As shown in FIGS. 3 and 4, the stator lamination stack 18 has four identical poles 40, 41, 42, 43 separated by slot openings or pole gaps 44 leading to grooves 45 into which, according to FIGS. 1 and 2, the coil windings are placed.

In accordance with the present invention, the shape of air gap especially in combination with the magnetization of the rotor magnet is of critical importance in order to obtain the desired course of the reluctance torque. In theory, it would be desirable to obtain a completely monotonic air gap, that is, an air gap free of any magnetic discontinuities. In actual practice, however, this cannot be achieved since the pole gaps 44 are required in order to permit introduction of the wire for the windings into the grooves 45. Thus, the pole gaps 44 must have a certain minimum width, but it is desirable to provide the minimum which permits introduction of a wire for winding under commercially reasonable conditions, for example, in the order of about 3 mm. The pole gaps 44 introduce momentary or instantaneous variations in torque. In most all applications, these minute variations in torque can be neglected. In some extremely sensitive applications, however, for example in video recording equipment, these minute instantaneous variations may cause disturbances. It is desirable to reduce these instantaneous variations in drive torque, particularly in small motors in which the width of the pole gaps is relatively great with respect to the overall length of the pole shoe.

For a motor of 56 mm diameter, for example, corresponding to a pole pitch of about 44 mm in a four-pole motor, the relationship of pole gap to pole pitch is about 7%. This percentage of course decreases with increasing motor diameter and than has decreasing influence on the course of the instantaneous torque-rotation relationship.

This invention addresses this problem and at the same time provides a structure that has a high starting torque to overcome the problem of dry friction indicated earlier. Along with the solution to these problems, it is also desirable to provide a structure that also will provide the highest power output for a given size motor. Accordingly, another important feature of this invention is achieving the aforementioned solutions while providing an averaging smaller air gap to enhance power output of the motor.

FIG. 5 shows on a greatly enlarged scale and by a development, the configuration of air gap 19 over the width of one pole, i.e. 180°-el. This air gap configuration, which produces a reluctance torque, is the same for all four stator poles and is consequently only shown for the stator pole 40.

By means of a broken line, FIG. 3 shows the circle 49 representing the circular cylindrical envelope of a lamina of stator lamination stack 18. The point of minimum air gap occurs at point 50 at the outer end of the upper pole tip 51. The point of maximum air gap occurs at point 52, somewhat inwardly of lower pole tip 53. As in German Patent No. 23 46 380, the rotor magnet 16 is approximately trapezoidally magnetized and, as stated hereinbefore, has narrow magnetic pole gaps 17 between its poles. In the inoperative state, i.e. when motor 10 is current-free, these gaps 17 are opposite the maximum air gap points 52, as indicated in FIG. 5 (zero passage of the reluctance torque). Between points 50 and 52 the air gap increases in a monotonic manner and from point 50 in a direction counter to the rotation direction, gradually in the first half of the pole arc and then to a more pronounced extent in the second half of the pole arc. This configuration is obtained as seen in FIG. 3 by a circular sector-shaped construction, the center of the circle 70 that is, the center of the circular ring sector for pole 41 being approximately on the angle bisector 71 between stator poles 40 and 41 and has a distance 73 from the center of the lamination, which preferably is approximately 3 to 6% of the diameter of envelope cylinder 49. That is, the center of the circular ring sector (see radius 74 of pole 41) is located approximately on the angle bisector between a stator pole (such as pole 41) and the adjacent stator pole (such as pole 40) in the rotation direction. The radius of the circular sector is designated 74 and, as shown, at point 50 this circular sector, for example, for stator pole 41 passes at least tangentially to envelope cylinder 49 that is, the decreasing air gap in the sector of the slot at the second half of a stator pole arc (such as the arc of stator pole 40 or 41) passes approximately tangentially into the air gap side of a circle (i.e., envelope 49) circumscribing the maximum diameter of the stator lamination. This construction naturally also has advantages from the stamping standpoint. Thus, the circular ring sector extends, for example in the instance of stator pole 41, from point 50 approximately to point 52. As clearly shown for each stator pole 40, 41 a magnetically effective air gap, from a point of maximum gap of each pole, rapidly diminishes in the rotation direction over the upstream half of the corresponding stator pole arc and gradually decreases over the second, downstream half of the stator pole arc. Of course, upon observing the configuration from the viewpoint of an opposite direction, the effective air gap increases from a first value in the downstream half of the stator pole to a maximum in the other, upstream half of the stator pole. The construction of the other stator poles is completely symmetrical, as is clearly shown in FIG. 4. FIG. 4, which illustrates a four-pole external rotor-type motor with salient stator poles, shows the stator poles constructed from the point of maximum air gap to the minimum air gap as circular ring sectors. According to the present invention, the diameter of the circular ring sectors is approximately 85% to 95% of the maximum diameter of the stator.

In FIG. 5, the point of the minimum gap of stator pole 43 is designated as 50'. It can be seen that from point 50' to point 52, in a small angular area of about twice the width of the pole gap 44, there is a first considerable increase in the air gap dimension in the rotation direction followed by a considerable decrease toward point 50. As shown in FIG. 5, the effective air gap includes a first sector, located immediately upstream of point 50', having a circumferential length greater than the circumferential length (e) of the pole gap or slot 44 and having a small magnetically effective air gap extending in the direction of rotation of the rotor 16 substantially to the leading edge of the slot 44. A second sector of the air gap follows the first sector in the direction of rotation of the rotor 16 and has a substantial increase (a) in the magnetically effective air gap from the leading edge to the trailing edge of the slot 44. A third sector follows the second sector in the direction of rotation of the rotor 16 and has a circumferential length (c) about the same as the circumferential length of the slot 44 and has a substantial increase in the magnetically effective air gap from its leading end to its trailing end 52.

As indicated in FIG. 5, $\tau p$ designates a separation of 180°-el between pole gaps 44. A further feature of the present invention is that the distance of the center of the circular ring sector from the center of the stator is approximately 3% to 6% of the maximum diameter of the stator.

With motors of this type, the form of the reluctance torque is largely determined by the nature in which the air gap 19 increase and decreases in size. To assist in understanding this, it can be taken that the production of the reluctance torque is concentrated in pole gap 17 of the rotary permanent magnet. (In reality, pole gap 17 naturally produces no torque, because it is largely non-magnetic). As the pole gap 17 moves from point 50' to point 52 during rotation, a powerful driving reluctance torque is produced designated by 75 in FIG. 6B. This driving reluctance torque is produced during a period when no electromagnetic torque is being supplied to the rotor 16. Note in FIG. 6A the gaps 76 between the motor currents ($i_{Mot}$) in the motor operation.

Figure 6A:
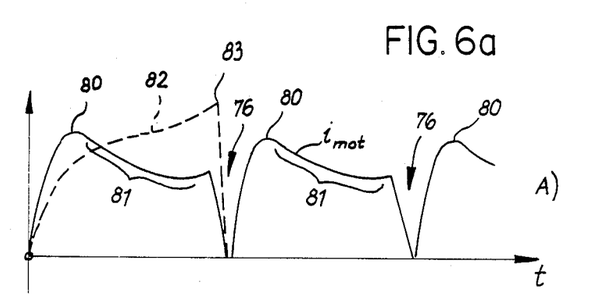
FIGS. 6A and 6B shows curves to illustrate the operative aspects of the invention.
Figure 6B:
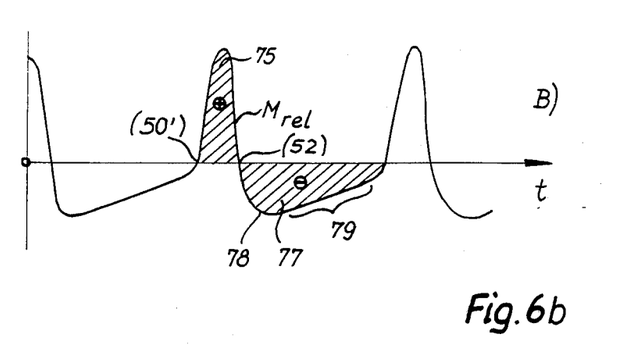

As the electromagnetically driven rotor magnet 16 continues to rotate, the pole gap 17 passes through the air gap range from 52 to 50, and a braking reluctance torque is produced designated by 77 on the opposite side of the curve reference line in FIG. 6B. It is desirable in this connection that this braking reluctance torque is relatively uniform.

This ensures that even with relatively pronounced dry friction which is characteristic of certain applications, for example, for disk storage drives, the rotor always comes into the correct starting position when the motor is deenergized and comes to rest, as designated at 52 in FIG. 6B, and which corresponds therefore to the rotor position illustrated in FIG. 5 in which the pole gap 17 faces stator point 52.

However, in spite of this effect of the braking reluctance torque 77 there is also a favorable effect of the total torque, because as a result of the aforementioned displacement of the Hall generator 37 with respect to the rotation direction 26 by the angle 39, after commutation, the motor current rapidly rises to a maximum value 80 (FIG. 6A) corresponding to a maximum electromagnetically produced torque and which in time roughly coincides with the maximum 78 of the reluctance torque (FIG. 6B) and because subsequently, as a result of the then high counter (or back) e.m.f. which is built up in the particular stator winding, the motor current drops in zone 81 with the result that the electromagnetic torque drops correspondingly and the zone 81 approximately coincides with the decreasing zone 79 of the braking reluctance torque. In other words, the electromagnetic starting torque and the reluctance torque are adapted to one another in an optimum manner.

Thus, such a motor combines the fundamentally opposing requirements of reliable starting in the case of dry friction and a substantially uniform total torque. Where there is limited friction, starting naturally takes place much more easily, and so the motors according to the invention are suitable for the wide range of applications from equipment fans to magnetic disk storage.

At 82 in FIG. 6A, a broken line shows the pattern of the motor current when arranging the Hall generator 37 in the magnetically neutral zone 38 (FIG. 2). Here there is a more gradual current rise and the current maximum 83 is at a completely different point, i.e. just before the commutation time. In such case, there would be a very irregular total torque. Furthermore, the high current peaks 83 on disconnection would also be disadvantageous, because they could cause magnetostrictive noise in the laminations. Thus, the invention also leads to a low-noise and electrically interference-free operation of the motor.

The same principle can naturally be used with an internal rotor-type motor. It is then merely necessary to consider that FIG. 5 is drawn as a development or pattern. For an external rotor-type motor the pattern is bent upwards and for an internal rotor-type motor, downwards.

It is naturally possible for bringing about a rapid current rise after commutation, i.e. to obtain "early" commutation, to leave the hall generator 37 in the neutral zone 38 and instead to somewhat displace the pole gaps for the rotor magnet 16 at the point where it controls the Hall generator 37. This would lead to a more complicated form of rotor magnetization, but likewise to the "early" commutation. In either event, according to the present invention, the rotation position detector or hall generator is fixedly mounted with respect to the stator and means (i.e., the pole gaps of the rotor) for controlling the detector is disposed on the rotor, the detector and the controlling means being positioned to produce an early commutation to obtain a rapid rise in current in the stator winding controlled by the rotation position detector in a zone of low voltage induced by the stator winding.

A modification of the configuration as shown in dotted lines in FIG. 5 achieves advantageous results. It can be seen that if the pole 40 takes the contour including the dotted lines, the average air gap is diminished, resulting in a slightly improved total power output of the motor while retaining the previously described features of the invention. Such contour can be formed by making the gap surface between 50 and a point inwardly of 52 circular according to radius R2, and the portion of the curve that includes the point 52 also circular according to radius R1. This also results in easier stamping of the laminations for the stack 18 during manufacturing.

In accordance with the invention, optimum results are obtained if (a) is made about equal to (t); (c) is made about equal to (e); and the lamination side of the gap is made circular in accordance with the dotted lines.

Various changes and modifications may be apparent to one skilled in the art in view of the foregoing description. Accordingly, it is intended to embrace all such modifications and changes as fall within the spirit and scope of the appended claims.

What is claimed is:

1. A two-pulse brushless direct current motor having an approximately cylindrical air gap and including a permanent magnet rotor with approximately trapezoidal magnetization and narrow gaps between its poles, a stator including a winding and a plurality of stator poles, each of said poles having a slot at each of its ends opening toward the air gap, a rotation position detector fixedly mounted with respect to the stator and responsive to the position of the rotor, said detector controlling the current to said winding so as to generate an alternating magnetic field in the air gap which reacts with the permanent magnet rotor to thereby produce an electromagnetic torque with small interruptions, the stator poles being constructed so as to provide a magnetically effective air gap, between the stator and the oppositely located circumference of the rotor for producing a reluctance torque varying over the rotation angle, wherein the improvement comprises, said effective air gap on either side circumferentially of one of said slots including a first sector having a circumferential length greater than the circumferential length of said one of said slots and having a small magnetically effective air gap extending in the direction of rotation substantially to the leading edge of said one of said slots, a second sector having a substantial increase in the magnetically effective air gap from the leading edge to the trailing edge of said one of said slots, a third sector following said second sector in the direction of rotation having a circumferential length about the same as the circumferential length of the said one of said slots and having a substantial increase to a maximum dimension in the magnetically effective air gap from its leading end to its trailing end, and a fourth sector following said third sector in the direction of rotation and including the main portion of a stator pole, the magnetically effective air gap in said fourth sector decreasing over the circumference of the main portion of the stator pole in the direction of rotation from said maximum dimension to said small magnetically effective air gap of said first sector.

2. The motor according to claim 1, wherein the rotation position detector is fixedly mounted with respect to the stator and means for controlling said detector is disposed on said rotor, and said detector and said controlling means are positioned to produce an early commutation to obtain a rapid rise in current in the stator winding controlled by the rotation position detector in a zone of a low voltage induced by the stator winding.

3. The motor according to claim 1, wherein the rotation position detector is offset by approximately 0° to 5°-el from a center of one of said slots in a direction counter to the rotation direction, and is controlled by the magnetization of said permanent magnet rotor to obtain an accordingly earlier commutation.

4. The motor according to claim 1, wherein the magnetically effective air gap is defined by an inner circumference of said rotor and an outer surface of the stator poles.

5. The motor according to claim 1, wherein the distance of a point on the stator of the maximum dimension of the effective air gap from an angle bisector between adjacent stator poles is approximately 3 to 6% of the maximum diameter of the stator.

6. The motor according to claim 1, wherein the magnetically effective air gap from a point of maximum gap diminishes monotonically in the rotation direction to a point of minimum gap.

7. The motor according to claim 6, wherein the magnetically effective air gap from a point of maximum gap rapidly decreases in the rotation direction over a first half of the corresponding stator pole arc and gradually decreases over a second half of the same stator pole arc.

8. The motor according to claim 7, wherein the second half of the stator pole arc in the rotation direction passes approximately tangentially to an air gap side of a circle circumscribing a maximum diameter of the stator pole.

9. The motor according to claim 8, which is constructed as a four-pole external rotor-type motor with salient stator poles, wherein the stator poles are constructed from a point of maximum air gap to a point of minimum air gap as circular ring sectors.

10. The motor according to claim 7, which is constructed as a four-pole external rotor-type motor with salient stator poles, wherein the stator poles are constructed from a point of maximum air gap to a point of minimum air gap as circular ring sectors.

11. The motor according to claim 10, wherein the diameter of a circular ring sector is approximately 85 to 95% of a maximum diameter of the stator.

12. The motor according to claim 11, wherein a center of a circular ring section is located approximately on an angle bisector between a stator pole and an adjacent stator pole in the rotation direction.

13. The motor according to claim 12, wherein the distance of the center of a circular ring sector from the center of the stator is approximately 3 to 6% of a maximum diameter of the stator.

14. The motor according to claim 1, wherein said substantial increase in the magnetically effective air gap in said second sector and said substantial increase in the magnetically effective air gap to a maximum dimension in said third sector are approximately equal to each other.

* * * * *

UNITED STATES PATENT AND TRADEMARK OFFICE
CERTIFICATE OF CORRECTION

PATENT NO. : 4,730,136

DATED : March 8, 1988

INVENTOR(S) : Rolf Muller

It is certified that error appears in the above-identified patent and that said Letters Patent is hereby corrected as shown below:

Column 1, line 63, change "than" to --then--.

Column 2, line 32, change "ling" to --line--.

Column 2, line 46, change "shows" to --show--.

Column 2, line 56, change "heard" to --hard--.

Column 3, line 13, after "." [period], insert --In the embodiment shown in the aforementioned literature reference, opposite windings 23 and 25 are connected in series with a transistor switch (not shown) and the series connected transistor switch and windings 23 and 25 are connected across a power supply (not shown). The other two windings 24 and 26 are connected in series with a second transistor switch (not shown) and series connected transistor switch and windings 24 and 26 are connected across the power supply. The transistor switches are switched by the Hall generator 37.--

UNITED STATES PATENT AND TRADEMARK OFFICE
CERTIFICATE OF CORRECTION

PATENT NO. : 4,730,136

DATED : March 8, 1988

INVENTOR(S) : Rolf Muller

It is certified that error appears in the above-identified patent and that said Letters Patent is hereby corrected as shown below:

Column 4, line 27, change "than" to --then--.

Column 7, line 3, change "hall" to --Hall--.

Column 7, line 10, change "hall" to --Hall--.

Signed and Sealed this

Thirteenth Day of September, 1988

*Attest:*

DONALD J. QUIGG

*Attesting Officer*     *Commissioner of Patents and Trademarks*